US006700091B2

(12) United States Patent
Jones et al.

(10) Patent No.: US 6,700,091 B2
(45) Date of Patent: Mar. 2, 2004

(54) PLASMA ARC TORCH TRIGGER SYSTEM

(75) Inventors: Joseph P. Jones, Lebanon, NH (US); Kevin D. Horner-Richardson, Cornish, NH (US); Kevin J. Kinnerson, Corinth, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 10/083,219

(22) Filed: Feb. 26, 2002

(65) Prior Publication Data

US 2003/0160031 A1 Aug. 28, 2003

(51) Int. Cl.[7] ................................................ B23K 10/00

(52) U.S. Cl. ............................ 219/121.48; 219/121.59; 219/121.55; 200/43.17

(58) Field of Search ........................ 219/121.55, 130.01, 219/130.4, 121.54, 121.57, 121.48, 137.31, 137.43; 200/43.17, 57

(56) References Cited

U.S. PATENT DOCUMENTS 3,469,070 A 9/1969 Bernard et al.
3,581,051 A * 5/1971 Brown ....................... 219/131
3,629,547 A 12/1971 Kester et al.
3,873,796 A 3/1975 Worobec, Jr.
4,250,366 A 2/1981 Erickson et al.
4,554,432 A 11/1985 Raloff
4,731,518 A 3/1988 Parmelee et al.
5,039,837 A 8/1991 Nourbakhsh et al.
5,338,917 A 8/1994 Stuart et al.
5,357,076 A * 10/1994 Blankenship .......... 219/121.54
5,597,497 A 1/1997 Dean et al.
5,698,122 A 12/1997 Lubieniecki et al.
6,025,574 A 2/2000 Colangelo, Jr.

* cited by examiner

*Primary Examiner*—Mark Paschall
(74) *Attorney, Agent, or Firm*—Harness, Dickey & Pierce, P.L.C.

(57) ABSTRACT

A trigger system for operating a plasma arc torch is provided that comprises a selector that operates between at least a first operating position and a second operating position, wherein the first operating position operates the plasma arc torch in a first mode to deliver gas to the plasma arc torch, and the second operating position operates the plasma arc torch in a second mode to deliver the gas and electric power to the plasma arc torch. Further, the selector comprises a neutral position that selects a neutral mode in which delivery of gas and electric power to the plasma arc torch is inhibited. The selector is preferably disposed within a housing of the plasma arc torch and is slidably operable between the first operating position, the second operating position, and the neutral position.

58 Claims, 13 Drawing Sheets

PLASMA ARC TORCH TRIGGER SYSTEM

FIELD OF THE INVENTION

The present invention relates generally to plasma arc torches and more particularly to devices and methods for operating a plasma arc torch in different operating modes.

BACKGROUND OF THE INVENTION

Plasma arc torches are commonly used for cutting, marking, gouging, and welding metal workpieces by directing a high energy plasma stream consisting of ionized gas particles toward the workpiece. The plasma arc torch is typically connected to a power supply that provides both gas and electric power for operation of the plasma arc torch and is operable through a trigger disposed within a torch handle for activation of the gas and the electric power. Because the plasma arc torch creates intense localized heating at relatively high plasma exit velocities, inadvertent operation of the trigger could result in a risk of personal injury and/or damage to surrounding objects.

To reduce the risk of inadvertent torch ignition, control systems and devices are commonly provided in plasma arc torches of the known art. For example, control systems are provided within some known art power supplies, which are often at a remote location relative to the operator, to initiate or terminate gas flow to the plasma arc torch. However, such control systems require the operator to either look away from the torch or the workpiece where an operation is being performed or delay operations in order to manipulate the gas flow. Accordingly, the use of gas control systems within the power supply is somewhat inefficient and increases the risk of inadvertent torch operation. In addition to control systems, control circuits are also known that isolate current flow to the torch until gas flow is initiated. Further, audible warnings are provided in some known systems to notify the operator that the torch is ready for operation so that the torch is not improperly used.

Additionally, activation of gas flow only, i.e. no electric power, is often advantageous in certain applications such as for cooling torch components, (e.g., electrode, tip), or the workpiece. However, many plasma arc devices do not provide for a gas only mode of operation, and those that do provide for such a mode require the operator to initiate and terminate the gas flow at the power supply, not local to the plasma arc torch where operations are being performed. As a result, operation of a gas only mode is relatively time consuming and cumbersome in plasma arc torch systems of the known art.

Inadvertent torch operation may also occur when the trigger is prematurely depressed by the operator while the torch is being positioned for operation. The trigger may also be inadvertently depressed when the torch is being disassembled for maintenance or when being placed down onto a surface or object that causes the trigger to be depressed. Accordingly, devices have been provided with plasma arc torch triggers of the known art to reduce the risk of inadvertent torch operation through engagement of the trigger. One known trigger system provides a safety member to prevent inadvertent operation of the torch, wherein the operator must reposition the safety member in order to depress the trigger. Unfortunately, engagement of the safety member requires increased manual dexterity of the operator (generally wearing gloves) to engage the trigger for operation of the plasma arc torch, which is often cumbersome and time consuming when the plasma arc torch is continually being ignited and turned off.

Accordingly, a need remains in the art for a device and method that provides gas control local to the torch and operator, and which provides for multiple operating modes to control the gas flow separate from the electric power. A further need exists for a device and method that reduces the risk of inadvertent torch operation and that requires less manual dexterity than trigger systems of the known art.

SUMMARY OF THE INVENTION

In one preferred form, the present invention provides an apparatus for delivering gas and electric power to a plasma arc torch that comprises a selector with at least a first operating position and a second operating position. The first operating position operates the apparatus in a first mode to deliver gas to the plasma arc torch, and the second operating position operates the apparatus in a second mode to deliver gas and electric power to the plasma arc torch. Further, the selector may further comprise a neutral position for selecting a neutral mode in which delivery of gas and electric power to the plasma arc torch is inhibited.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches or plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

In another form, a trigger system for use in a plasma arc torch is provided that operates a selector among one or more of a first operating position, a second operating position, and a neutral position. The first operating position operates the trigger system in a first mode to deliver gas to the plasma arc torch, the second operating position operates the trigger system in a second mode to deliver gas and electric power to the plasma arc torch, and the neutral position operates the trigger system in a neutral mode in which delivery of gas and electric power to the plasma arc torch is inhibited.

In another form of the present invention, a plasma arc torch is provided that comprises a gas control device and a housing disposed within a torch handle, wherein the housing is operable with the gas control device. Further, the plasma arc torch comprises a power switch disposed within the torch handle and a selector disposed within the housing, wherein the selector is operable with the power switch. Accordingly, the selector is operable to a first operating position such that the housing activates the gas control device, thereby operating the plasma arc torch in a first mode to deliver gas to the plasma arc torch. Moreover, the selector is operable to a second operating position such that the selector activates the power switch, thereby operating the plasma arc torch in a second mode to deliver gas and electric power to the plasma arc torch. Furthermore, the selector may comprise a neutral position such that delivery of gas and electric power to the plasma arc torch is inhibited.

In yet another form of the present invention, a housing is provided that is disposed within a trigger system of a plasma arc torch. A selector is disposed within the housing and is operable between at least a first operating position and a second operating position, and preferably a neutral position, wherein the first and second operating positions activate the gas and electric power, respectively, and the neutral position inhibits delivery of the gas and electric power as previously described.

In another form, the present invention provides a selector for use in a trigger system of a plasma arc apparatus that is operable between a first operating position, a second operating position, and a neutral position as previously described. The selector preferably comprises a post to limit operation of the trigger system such that delivery of gas and electric power to the plasma arc torch is inhibited. Additionally, the selector comprises an engagement member that activates a power switch disposed within the plasma arc torch to provide the gas and the electric power.

The present invention also provides methods of operating a plasma arc torch among one or more of a first operating mode wherein gas is delivered to the plasma arc torch, a second operating mode wherein gas and electric power are delivered to the plasma arc torch, and a neutral mode wherein delivery of gas and electric power to the plasma arc torch is inhibited.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
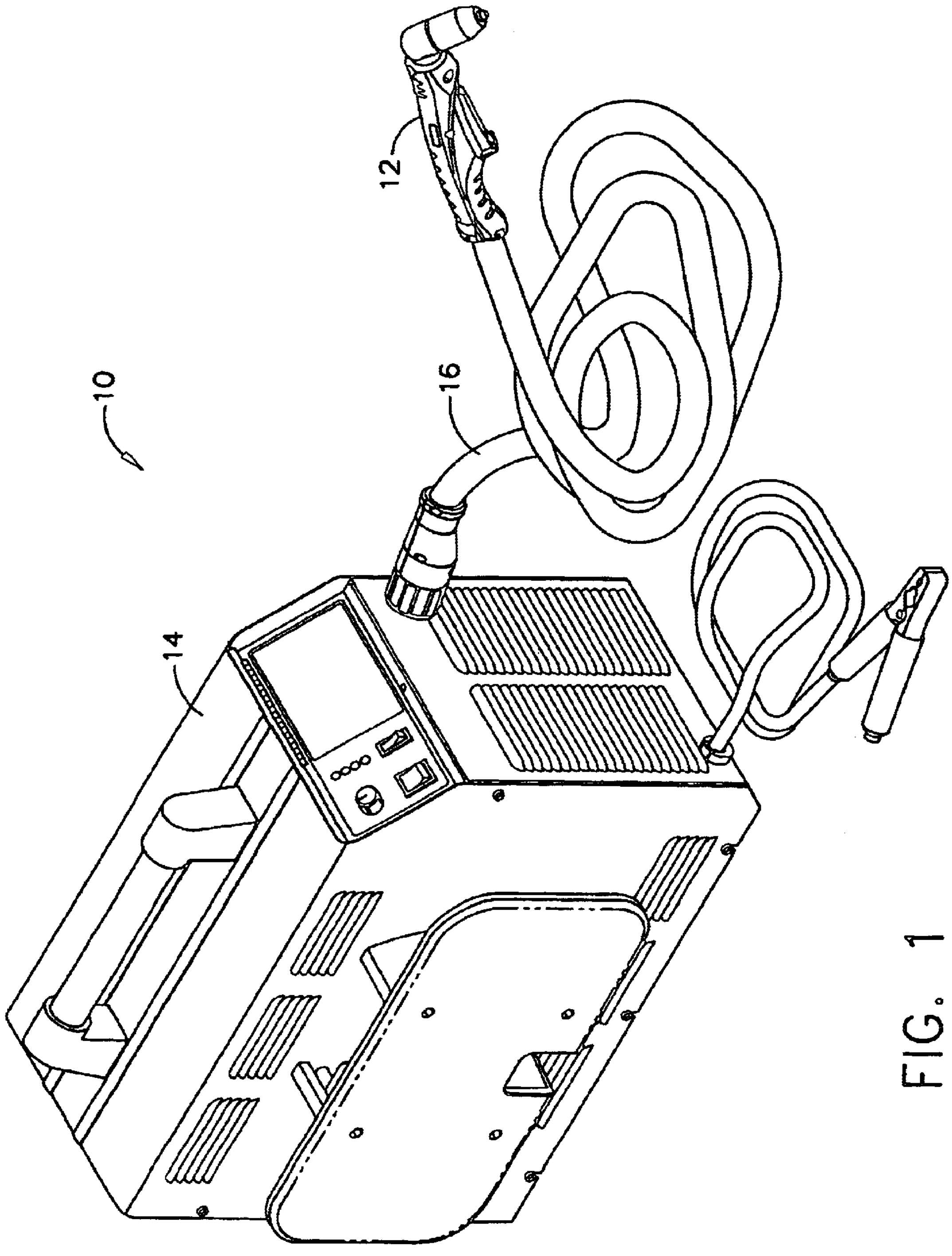
FIG. 1 is a perspective view of a manually operated plasma arc apparatus constructed in accordance with the principles of the present invention.

Referring to the drawings, a trigger system according to the present invention is generally operable with a manually operated plasma arc apparatus as indicated by reference numeral 10 in FIG. 1. Typically, the manually operated plasma arc apparatus 10 comprises a plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12 as described in greater detail below.

Figure 2:
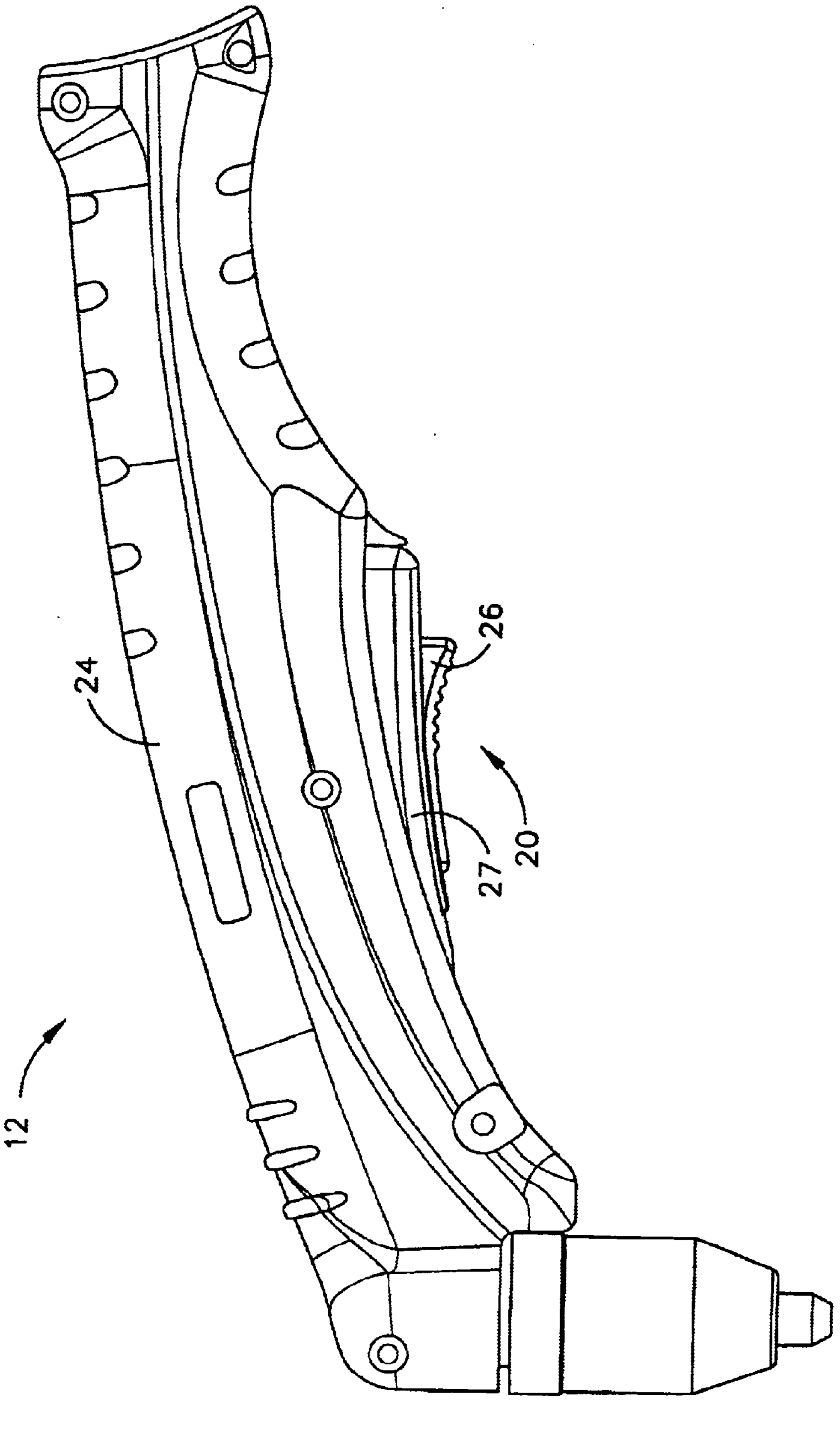
FIG. 2 is a side view of a trigger system disposed within plasma arc torch handle and constructed in accordance with the principles of the present invention.

Referring now to FIG. 2, a trigger system according to the present invention is illustrated and generally indicated by reference numeral 20. As shown, the trigger system 20 comprises a housing 22 disposed within a torch handle 24 of the plasma arc torch 12, and a selector 26 disposed within the housing 22. Generally, the selector 26 is operable between at least one of a first operating position, a second operating position, and preferably a neutral position, which are described in further detail below. In the first operating position, the selector 26 operates the plasma arc apparatus 10 (not shown) in a first mode to deliver gas to the plasma arc torch 12. In the second operating position, the selector 26 operates the plasma arc apparatus 10 in a second mode to deliver gas and electric power to the plasma arc torch 12. Further, when the selector 26 is in the neutral position, delivery of gas and electric power to the plasma arc torch 12 is inhibited. Accordingly, an operator may select the first mode to provide gas only for operations such as cooling torch components, or the operator may select the second mode to provide gas and electric power for operations such as cutting workpieces.

Figure 3A:
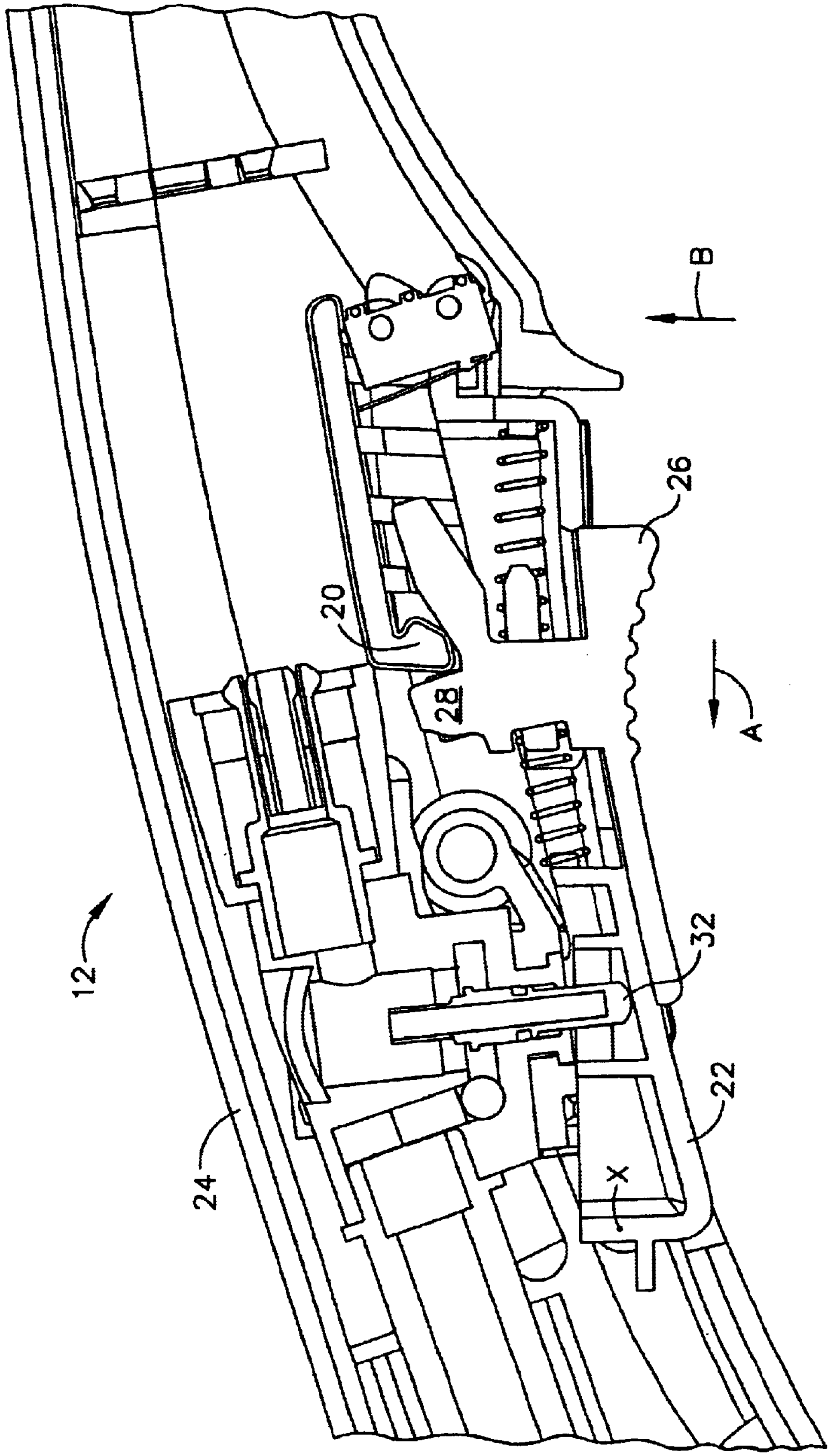
FIG. 3A is a cross-sectional view of a trigger system disposed within a plasma arc torch handle with a selector in a first operating position and constructed in accordance with the principles of the present invention.

Operation of the selector 26 in the first operating position, the second operating position, and the neutral position is more fully described with reference to FIGS. 3A through 3C. FIG. 3A illustrates the first operating position of the selector 26 that causes the plasma arc apparatus 10 (not shown) to operate in a first mode to deliver gas to the plasma arc torch 12. As shown, the selector 26 is preferably slidably operable along the housing 22 in the direction of arrow A such that a post 28 of the selector 26 clears a stop 30 defined within the torch handle 24. The housing 22 is then pivoted in the direction of arrow B about axis X such that the housing 22 activates a gas control device 32 to initiate gas flow from the power supply 14 (not shown) to the plasma arc torch 12. Accordingly, the first mode supplies gas only to the plasma arc torch 12.

Figure 3B:
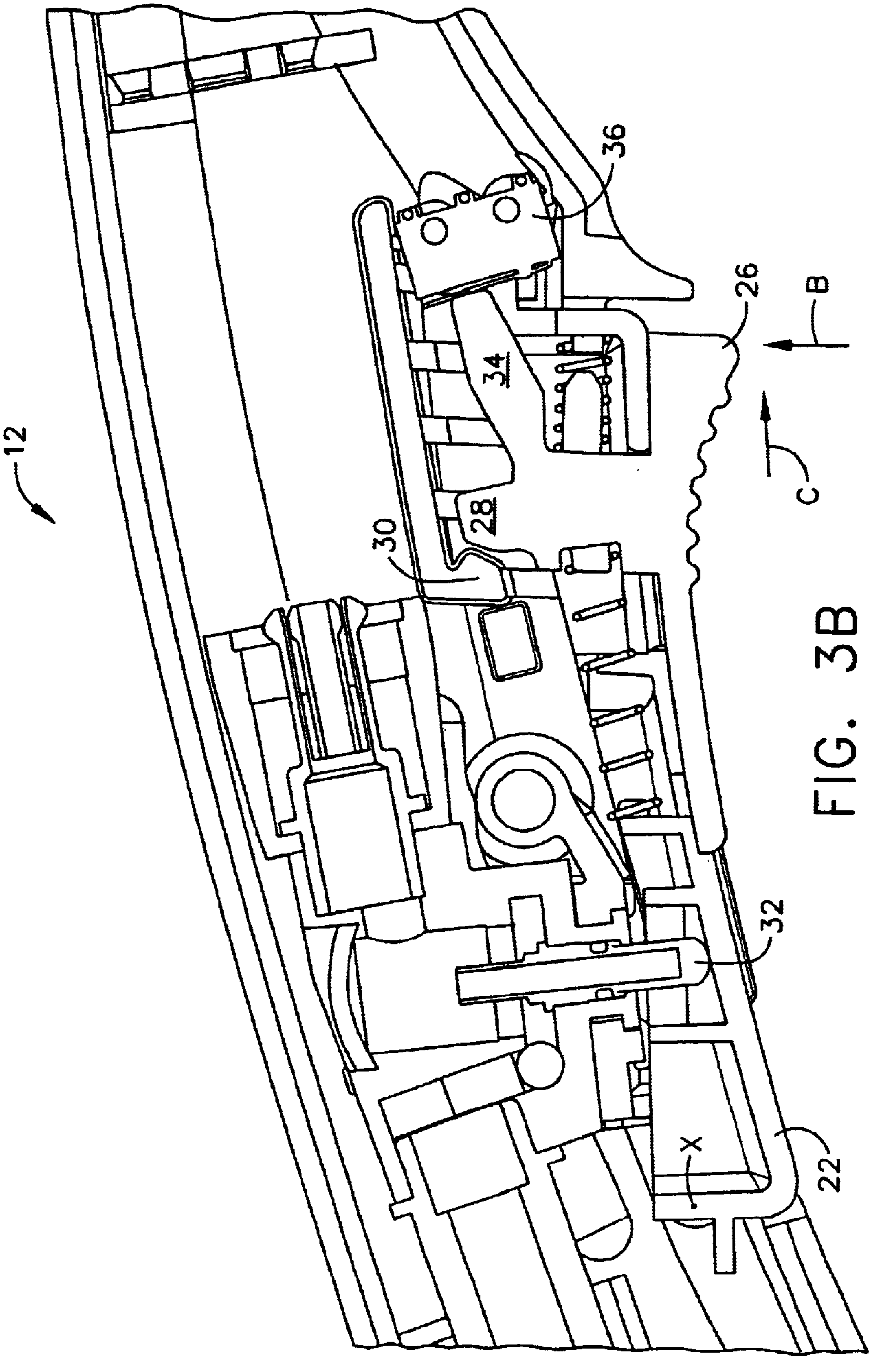
FIG. 3B is a cross-sectional view of a trigger system disposed within a plasma arc torch handle with a selector in a second operating position and constructed in accordance with the principles of the present invention.

FIG. 3B illustrates the second operating position of the selector 26 that causes the plasma arc apparatus 10 to operate in a second mode to deliver gas and electric power to the plasma arc torch 12. As shown, the selector 26 is slidably operable along the housing 22 in the direction of arrow C such that the post 28 again clears the stop 30. The housing 22 is then pivoted in the direction of arrow B about axis X while the selector 26 continues to be slidably operated along the housing 22 in the direction of arrow C. Accordingly, an engagement member 34 of the selector 26 activates a power switch 36 disposed within the torch handle 24, which activates the supply of electric power from the power supply 14 to the plasma arc torch 12. Further, as the housing 22 is pivoted, the housing 22 activates the gas control device 32 as previously described to initiate gas flow from the power supply 14 to the plasma arc torch 12. Accordingly, the plasma arc torch 12 is operated in the second mode with the supply of both gas and electric power.

In an alternate embodiment, the gas control device 32 may be omitted from the plasma arc torch 12 such that gas flow is activated by a gas control device within the power supply 14. In such an embodiment, the gas control device may be controlled by the power switch 36 or by an alternate switch (not shown) that may be activated by either the selector 26 or the housing 22 in the second operating position of the selector 26. In another form, wherein no gas control device is disposed within the plasma arc torch 12 and the gas and electric power are activated by the power switch 36, a second stop 31 is positioned within the torch handle 24 as shown. Accordingly, if an operator attempts to move the selector 26 forward in the direction of arrow A, the second stop 31 prevents such movement. Furthermore, if a gas control device 32 is subsequently provided within the plasma arc torch 12, the second stop 31 may simply be removed to allow for motion of the selector 26 in the direction of arrow A to activate the gas control device 32.

Figure 3C:
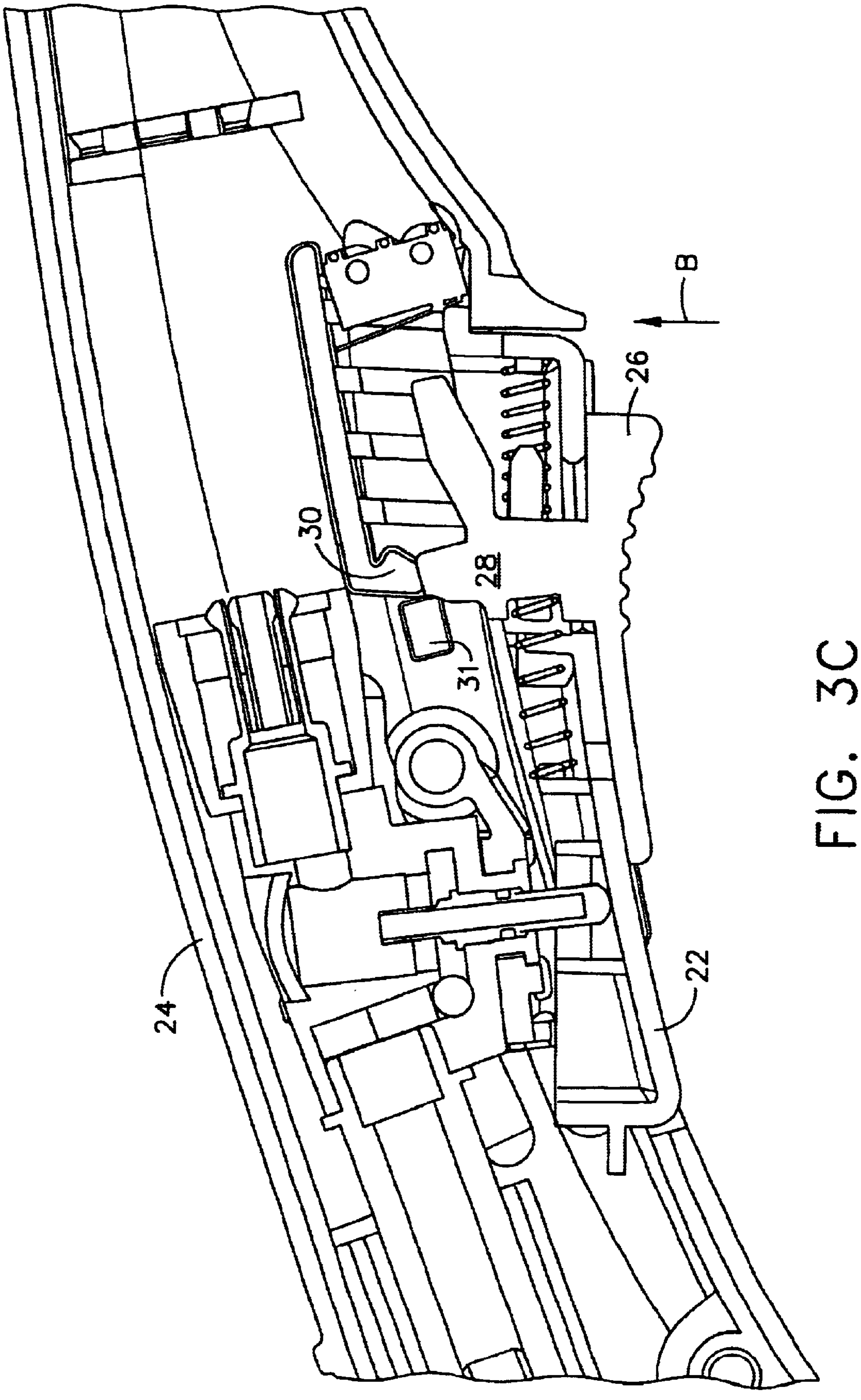
FIG. 3C is a cross-sectional view of a trigger system disposed within a plasma arc torch handle with a selector in a neutral position and constructed in accordance with the principles of the present invention.

Referring to FIG. 3C, the neutral position of the selector 26 is illustrated, which causes the plasma arc apparatus 10 to operate in a neutral mode to inhibit the supply of gas and electric power to the plasma arc torch 12. As shown, the selector 26 is resiliently biased to the neutral position from first and second operating positions. In the neutral position, the post 28 of the selector 26 is engaged with an adjacent member within the plasma arc torch, preferably the stop 30 within the torch handle 24, such that upward movement of the selector 26 and pivoting of the housing 22 in the direction of arrow B is limited, thereby inhibiting the delivery of gas and electric power to the plasma arc torch 12. In order to pivot the housing 22 for operation of the plasma arc torch 12 in either the first or second mode, therefore, the selector 26 must be moved to either the first operating position or the second operating, respectively.

As further shown, the selector 26 is preferably biased to the neutral position with a first spring 38 and a second spring 39 disposed within the housing 22. Generally, both the first spring 38 and the second spring 39 are partially compressed when the selector 26 is in the neutral position. As the selector 26 is moved to the first operating position, the first spring 38 compresses further, and compression of the second spring 39 is reduced as shown in FIG. 3A. As the selector 26 is moved to the second operating position, the second spring 39 compresses further, and compression of the first spring 38 is reduced as shown in FIG. 3B. When the selector 26 is released from either the first or second operating position, the first spring 38 and the second spring 39 resiliently bias the selector 26 to the neutral position.

Figure 4:
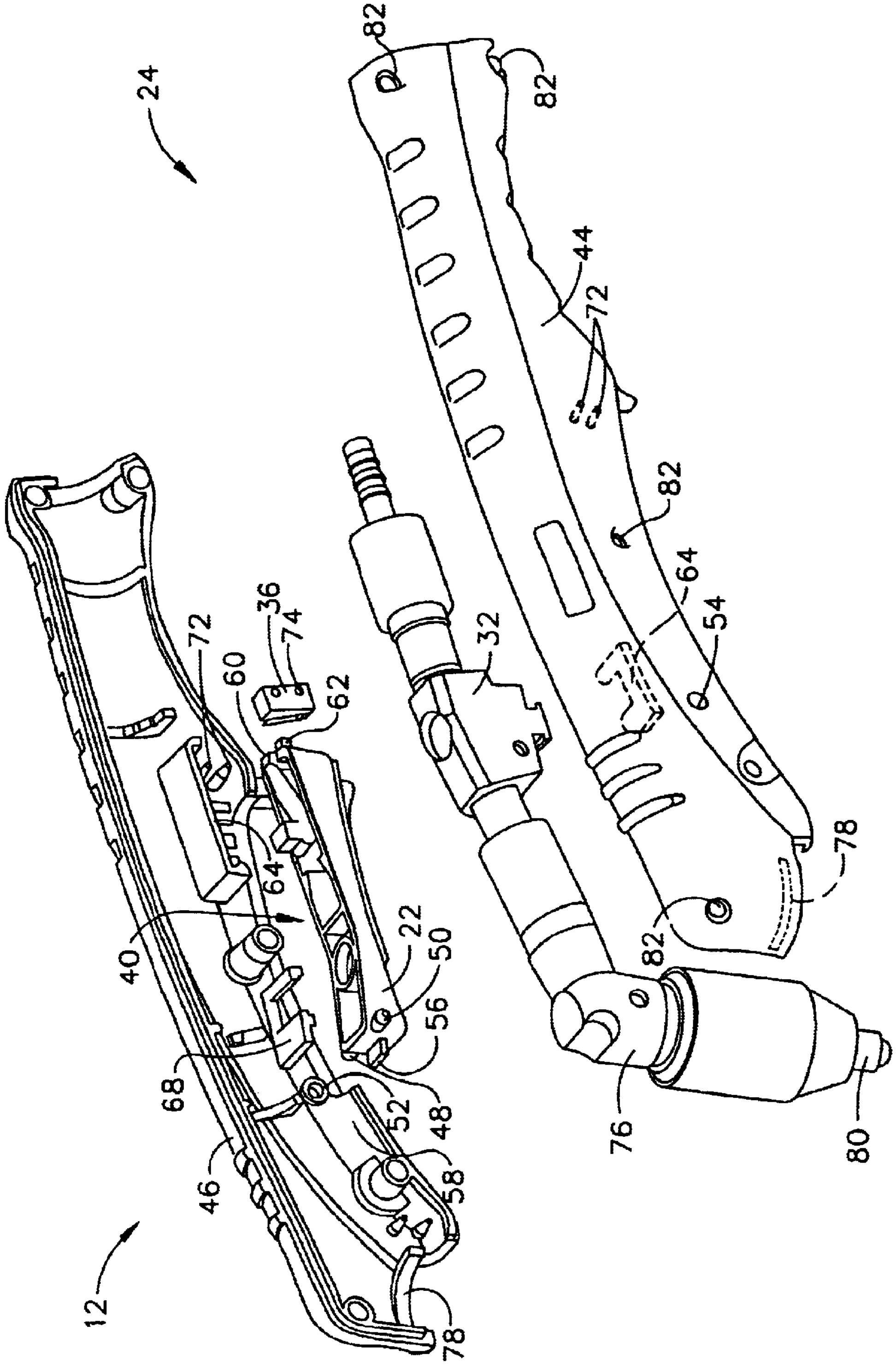
FIG. 4 is an exploded perspective view of a trigger system within a plasma arc torch and constructed in accordance with the principles of the present invention.

Referring now to FIG. 4, an exemplary trigger system 40 within the torch handle 24 of the plasma arc torch 12 is illustrated in greater detail. As shown, the torch handle 24 comprises a first handle half 44 and a second handle half 46, in which the trigger system 40 according to the present invention is disposed. As further shown, the housing 22 of the trigger system 40 comprises two pins 48 and 50 that engage a pin bearing cup 52 on the second handle half 46 and a pin bearing cup 54 (shown dashed) on the first handle half 44. To position and retain the housing 22 within the torch handle 24, the housing 22 comprises a first retention tab 56 that engages portions 58 of the handle halves 44 and 46 at a distal end of the housing 22. Further, the housing 22 comprises second and third retention tabs 60 and 62 that engage portions 64 of the handle halves 44 and 46 at a proximal end of the housing 22. Accordingly, the retention tabs 56, 60, and 62 retain the housing 22 within the assembled handle halves 44 and 46, while the pins 48 and 50 allow the housing 22 to pivot during operation as described in greater detail below. As used herein, the terms proximal or proximal direction should be construed as meaning towards or in the direction of the power supply 14 (not shown), and the terms distal or distal direction should be construed as meaning towards or in the direction of a torch head 76.

As further shown, the gas control device 32 is also disposed within the torch handle 24 and is positioned and retained by mating brackets 68 located within the handle halves 44 and 46. Accordingly, the brackets 68 secure the gas control device 32 within the torch handle 24 and properly position the gas control device 32 for activation by the housing 22, as described in greater detail below, to activate the supply of gas to the plasma arc torch 12. Additionally, the power switch 36 is disposed within the second handle half 46, preferably using one or more switch pins 72 that mate with one or more apertures 74 provided in the power switch 36. Accordingly, the switch pins 72 properly position the power switch 36 for activation by the selector 26, as described in greater detail below, to activate the supply of electric power to the plasma arc torch 12.

As further illustrated, the torch head 76 is also disposed within the plasma arc torch 12 and is positioned by shoulders 78 on the handle halves 44 and 46. Generally, both gas and electric power are provided to the torch head 76 through operation of the trigger system 40 according to the present invention such that a plasma stream is generated and plasma is ejected from a tip 80 for operations such as cutting, marking, gouging, or spraying, among others.

Once the components of the plasma arc torch 12, e.g., the trigger system 40, the gas control device 66, the power switch 36, and the torch head 76, are positioned within the second handle half 46, the first handle half 44 is placed adjacent the second handle half 46 and is secured thereto, preferably using a plurality of mechanical fasteners (not shown) through fastening holes 82. Alternately, the handle halves may be connected using a quick disconnect as disclosed in copending application titled "Modular Plasma Arc Torch," filed Feb. 26, 2002, which is commonly assigned with the present application and the contents of which are incorporated herein by reference.

In operation, the torch handle 24 provides thermal and electric isolation between the components disposed therein and an operator holding the plasma arc torch 12. Accordingly, a nonconductive material such as Nylon is used for the material of the first handle half 64 and the second handle half 66. Furthermore, the retention members, e.g. first ledges 58, second ledges 64, brackets 68, located within the first handle half 46 and the second handle half 48 are preferably integrally molded with the torch handle 24, although separate members may be mounted therein in accordance with the teachings of the present invention.

Figure 5:
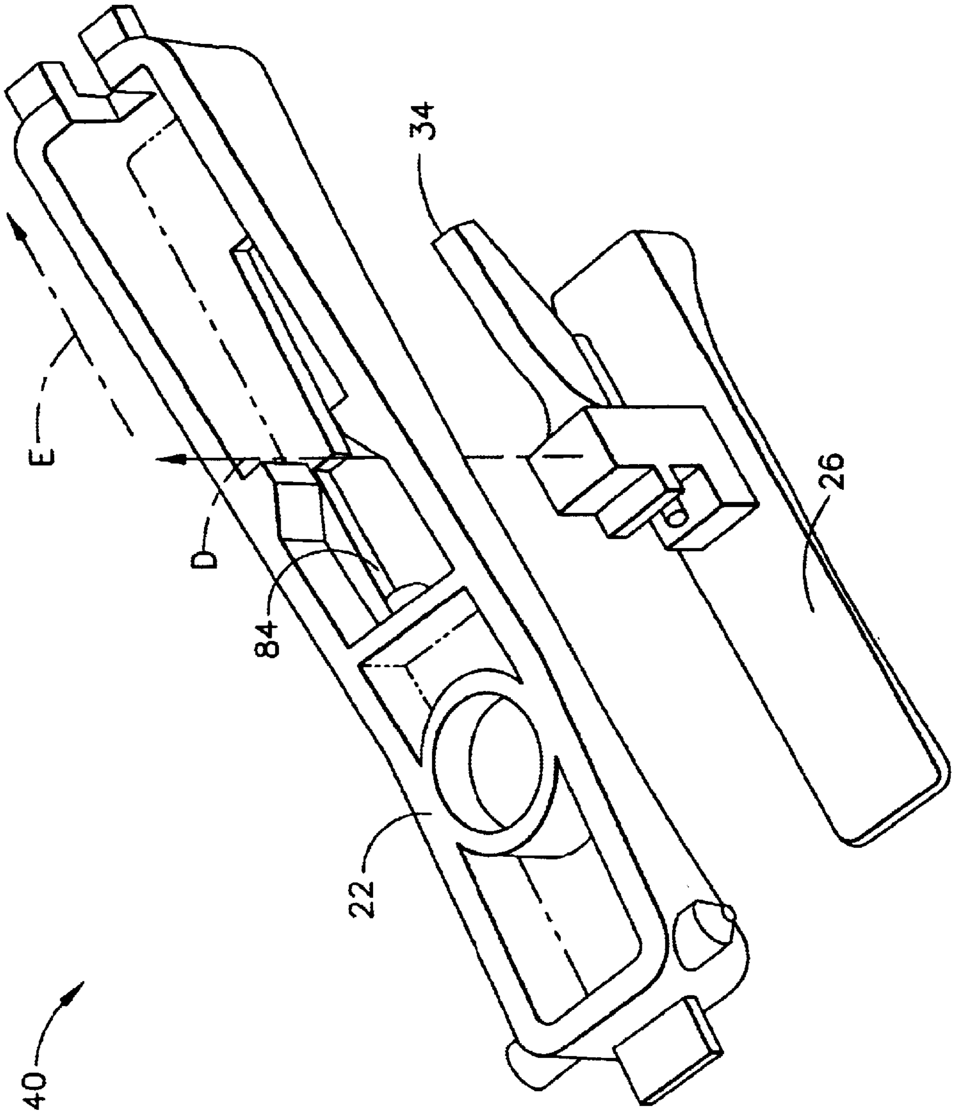
FIG. 5 is an exploded perspective view of a selector positioned for assembly into a housing of a trigger system and constructed in accordance with the principles of the present invention.

Referring now to FIG. 5, the housing 22 and the selector 26 of the trigger system 40 are described in further detail. As shown, the selector 26 is assembled into the housing 22 by inserting the selector 26 in the direction of arrow D into an aperture 84 defined by the housing 22. The selector 26 is then translated in the direction of arrow E until the engagement member 34 of the selector 26 is properly positioned within the housing 22.

Figure 6A:
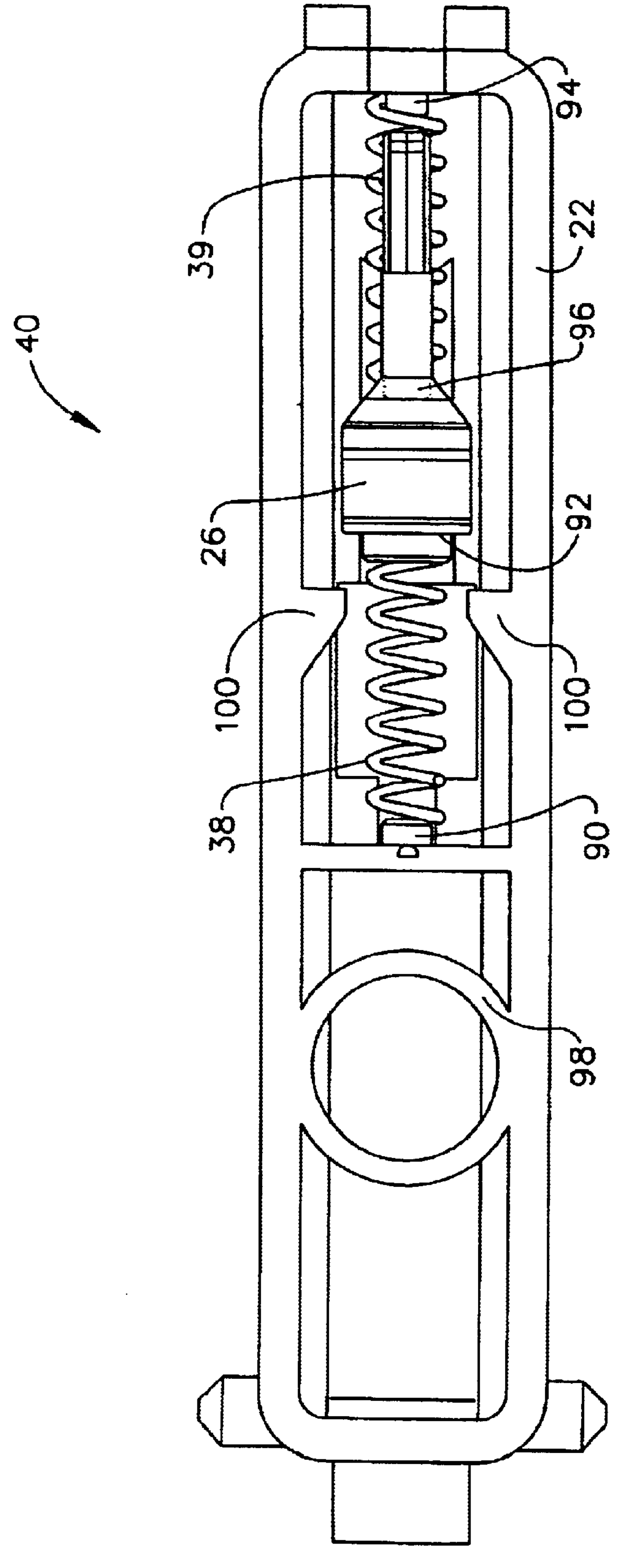
FIG. 6A is a top view of a selector resiliently biased to a neutral position within a housing of a trigger system and constructed in accordance with the principles of the present invention.
Figure 6B:
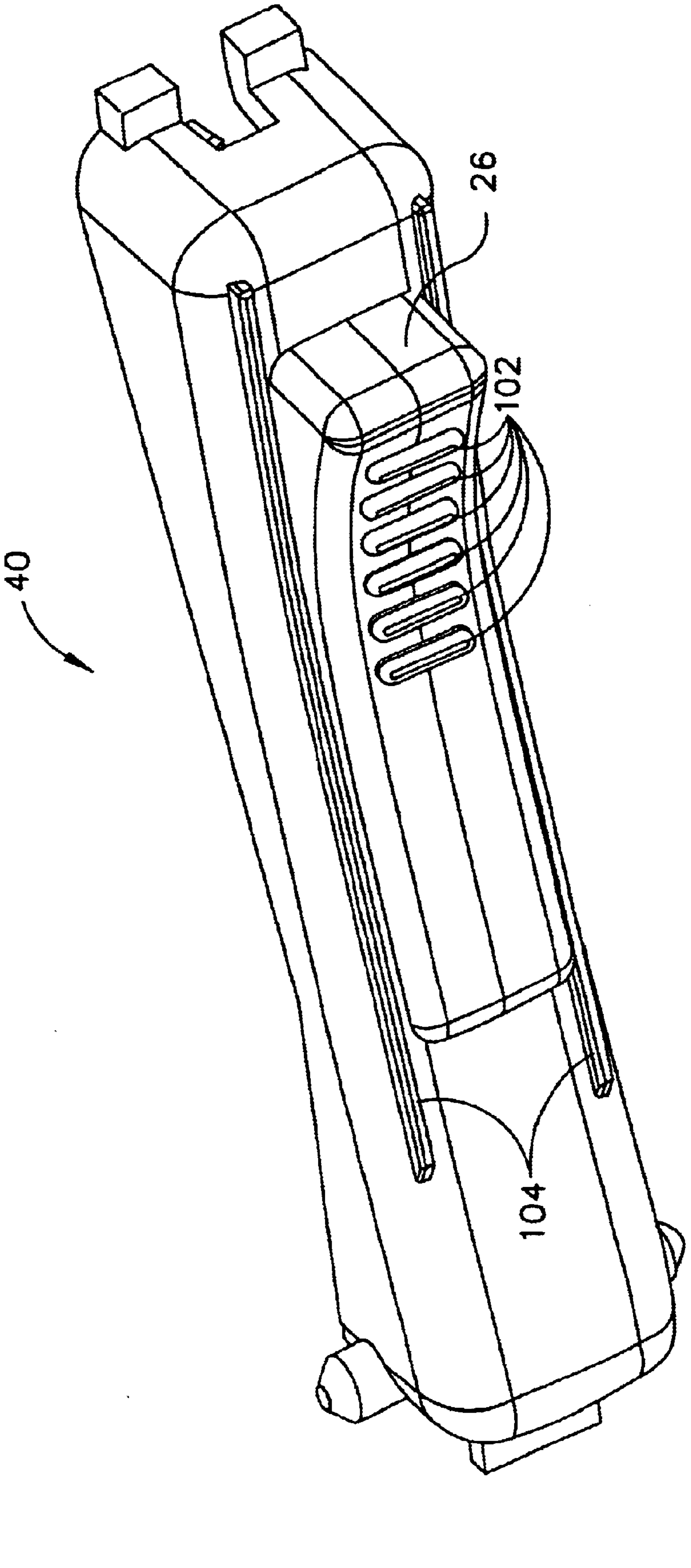
FIG. 6B is an exterior perspective view of a selector disposed within a housing of a trigger system and constructed in accordance with the principles of the present invention.

Referring now to FIGS. 6A and 6B, the selector 26 is shown fully assembled within the housing 22, wherein the first spring 38 and the second spring 39 that resiliently bias the selector 26 to the neutral position are disposed within the housing 22. Accordingly, a housing first spring boss 90 is formed within a distal portion of the housing 22 and a selector first spring boss 92 is formed within a distal portion of the selector 26 to position and retain the first spring 38. Similarly, a housing second spring boss 94 is formed within a proximal portion of the housing 22 and a selector second spring post 96 (shown dashed) is formed within a proximal portion of the selector 26 to position and retain the second spring 39. As further shown, an engagement cup 98 is defined within the housing 22 for operation of the gas control device 32 (not shown) as described in greater detail below. Furthermore, the housing 22 also defines slide retainers 100, which provide a boundary for the selector 26 to maintain proper orientation thereof during operation.

As shown in FIG. 6B, the exterior of the trigger system 40 is illustrated, wherein the selector 26 preferably defines raised ribs 102 to facilitate an improved grip between the hands or gloves of an operator and the selector 26, which further aids in positioning the selector 26. Additionally, the selector 26 is preferably disposed between parallel guides 104 to prevent rotation or misalignment of the selector 26 during operation.

Figure 7:
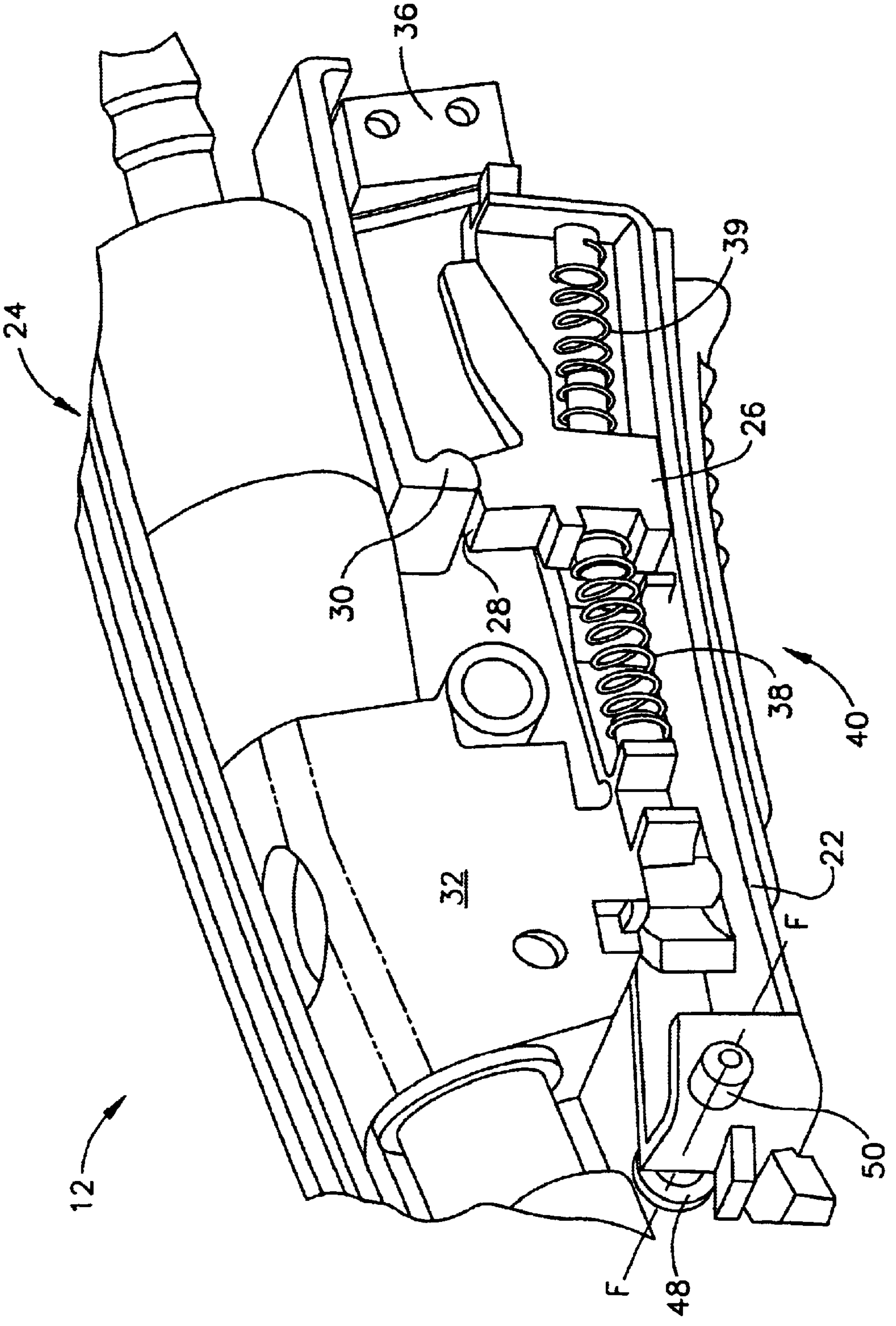
FIG. 7 is a perspective view of a trigger system disposed within a second half of a plasma arc torch handle, with a selector in a neutral position, and constructed in accordance with the principles of the present invention.

Referring now to FIG. 7, the trigger system 40 fully assembled within an exemplary embodiment of the present invention is illustrated in further detail. As shown, the post 28 of the selector 26 is in slideable contact with the stop 30 of the torch handle 24 such that the housing 22 is inhibited from pivoting about axis F, which is formed along a common centerline of the pins 48 and 50 of the housing 22. Further, the first spring 38 and the second spring 39 resiliently bias the selector 26 as shown. Such a position of the selector 26, as previously set forth, is defined as the neutral position of the trigger system 40, wherein the neutral mode is selected. Accordingly, the housing is prevented from pivoting, and thus the gas control device 32 and the power switch 36 cannot be actuated. As a result, the supply of gas and electric power, respectively, to the plasma arc torch 12 is inhibited in the neutral mode.

Figure 8:
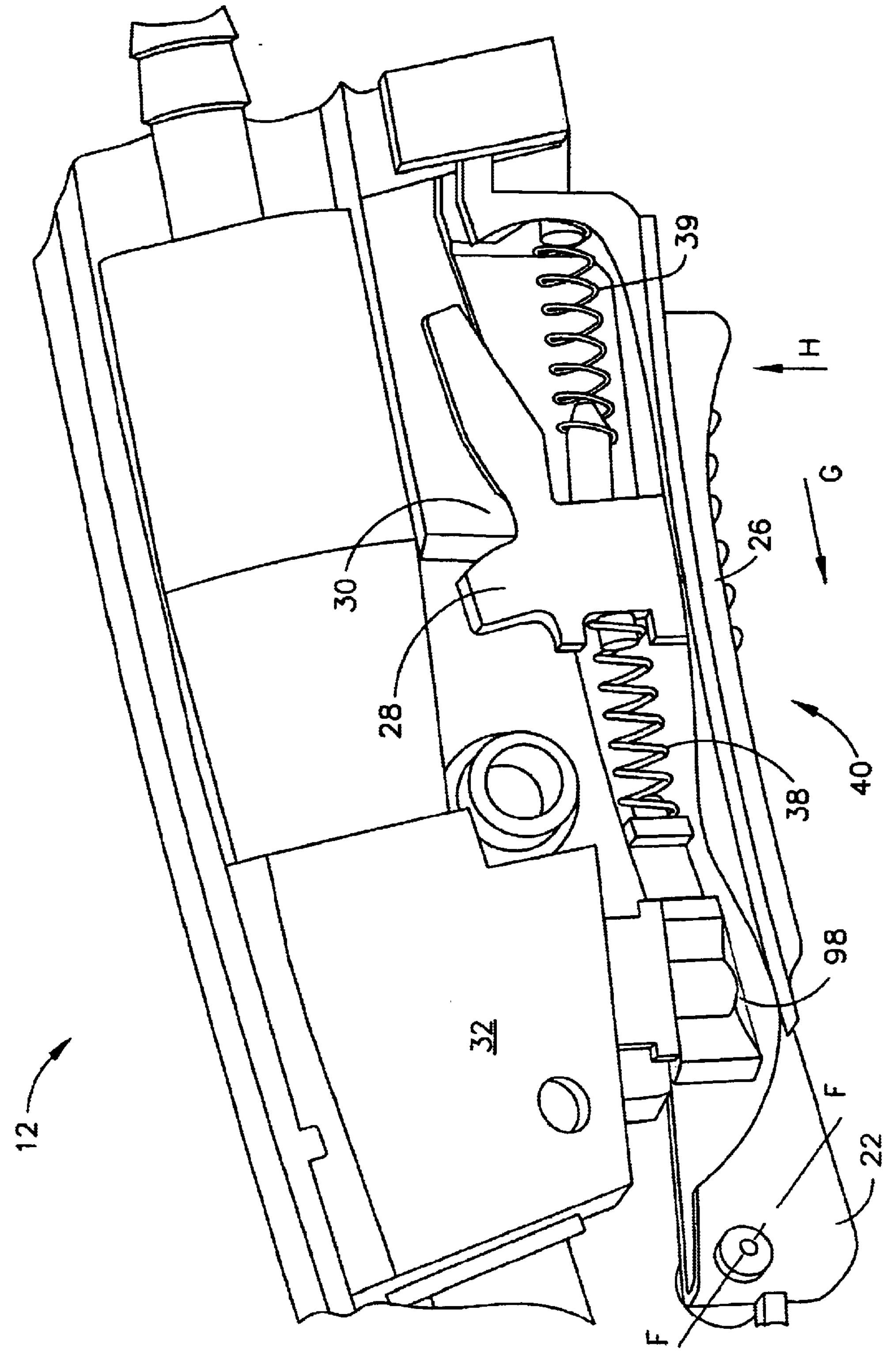
FIG. 8 is a perspective view of a selector within a trigger system positioned in a first operating position and constructed in accordance with the principles of the present invention.

With reference to FIG. 8, the trigger system 40 is shown with the selector 26 in the first operating position, in which only gas is provided to the plasma arc torch 12 in the first operating mode. To initiate gas flow, the operator moves the selector 26 in the direction of arrow G until the post 28 is disengaged from, or clears, the stop 30 as shown. Accordingly, the first spring 38 is further compressed, and compression of the second spring 39 is reduced. Once the post 28 clears the stop 30, the housing 22 may be pivoted about axis F in the direction of arrow H. Accordingly, the engagement cup 98 engages the gas control device 32 to activate gas flow to the plasma arc torch 12.

Figure 9:
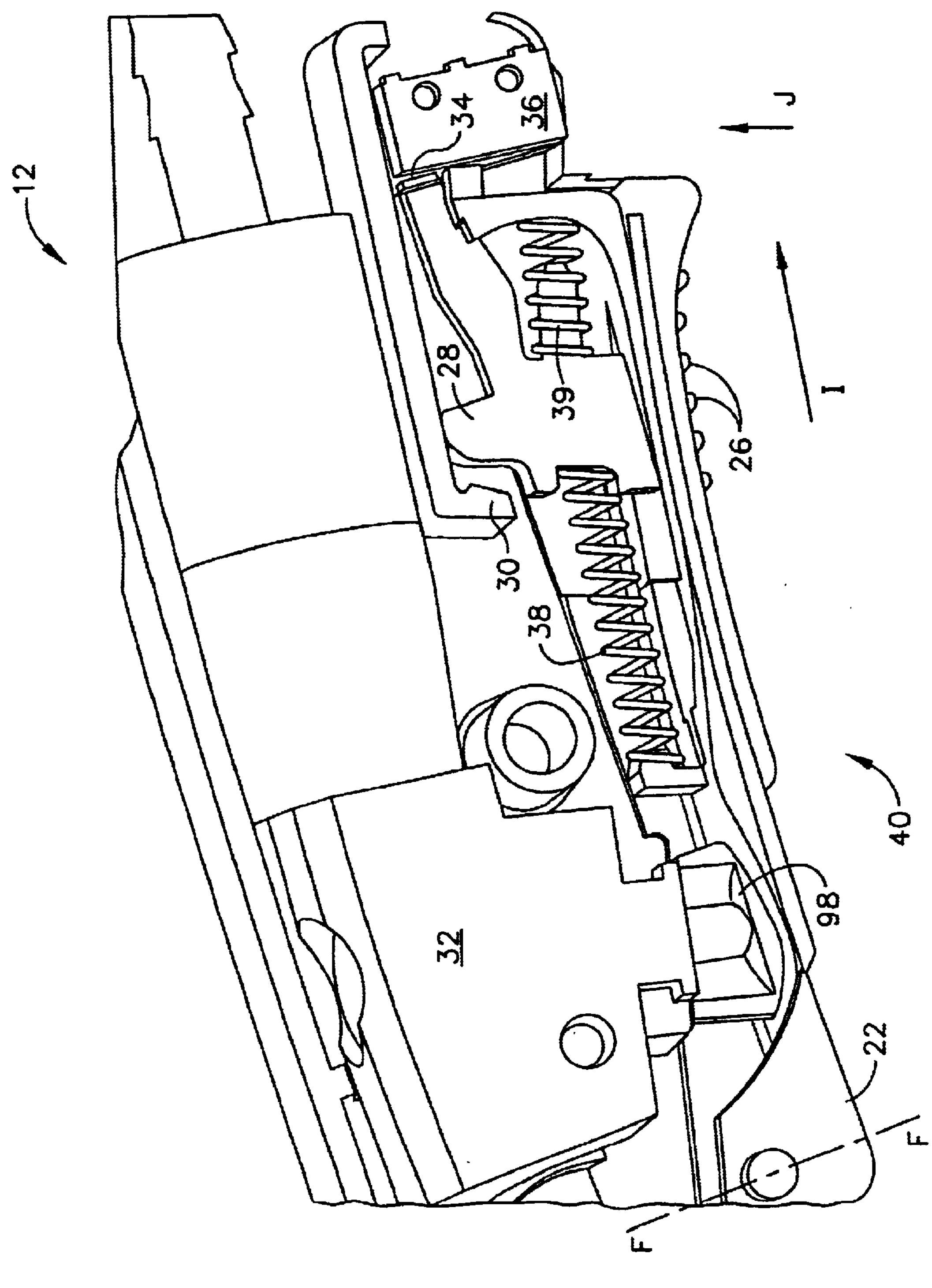
FIG. 9 is a perspective view of a selector positioned in a second operating position and constructed in accordance with the principles of the present invention.

Referring now to FIG. 9, the trigger system 40 is shown with the selector 26 in the second operating position, in which gas and electric power are provided to the plasma arc torch 12 in the second operating mode. To initiate gas flow and electric power, the operator moves the selector 26 in the direction of arrow I until the post 28 disengages from, or clears, the stop 30 as shown. Accordingly, the second spring 39 is further compressed, compression of the first spring 38 is reduced. Once the post 28 clears the stop 30, the housing 22 may be pivoted about axis F in the direction of arrow J, while the selector 26 continues to be moved in the direction of arrow I. As a result, the engagement cup 98 activates the gas control device 32 to activate gas flow to the plasma arc torch 12 and the engagement member 34 of the selector 26 activates the power switch 36 to initiate electric power to the plasma arc torch 12. The combination of translating the selector 26 in the direction of arrow I and pivoting of the housing 22 about axis F provides the requisite physical contact between the engagement cup 98 and the gas control device 32 and between the engagement member 34 and the power switch 36 to activate both gas and electric power to the plasma arc torch 12.

Figure 10:
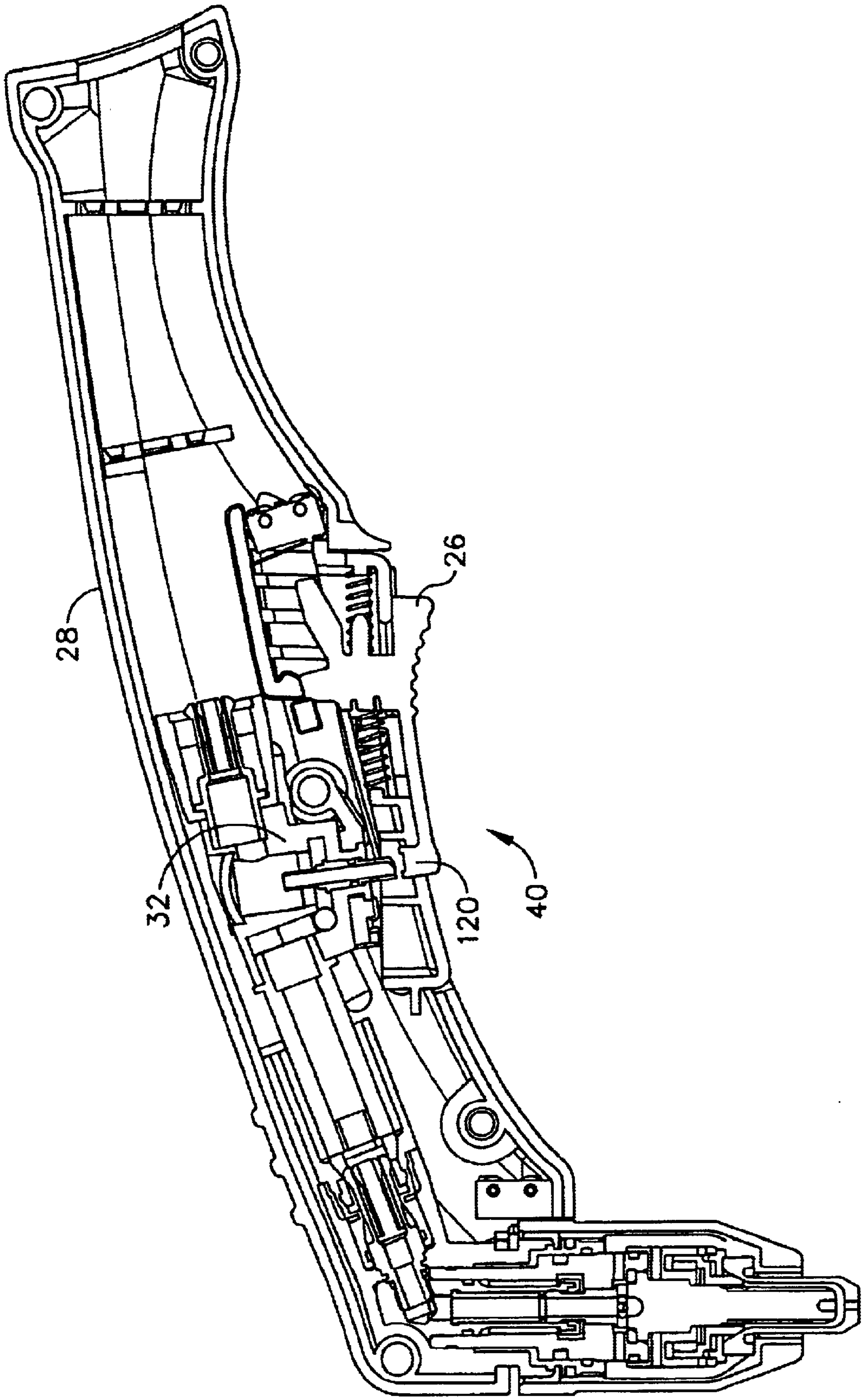
FIG. 10 is a cross-sectional view of an alternate embodiment of a trigger system, wherein a selector activates gas and electric power in accordance with the teachings of the present invention.

With reference to FIG. 10, the trigger system 40 in another form may be configured such that the selector 26 activates the gas control device 32 rather than the housing 22 as previously described. As shown, the selector 26 further comprises an extension 120 that activates the gas control device 32 to activate the supply of working gas to the plasma arc torch 12. Additionally, the gas control device 32 may be one of many possible devices such as a gas control valve, a switch that activates a gas control device (e.g., solenoid) in a power supply, or a solenoid, among others. Gas control within the handle 28 is further described in copending application titled "Torch Handle Gas Control," filed Feb. 26, 2002, which is commonly assigned with the present application and the contents of which are incorporated by reference.

Accordingly, the trigger system 40 of the present invention provides multiple operating modes for a plasma arc apparatus. Namely, at least a first operating mode is provided such that gas only is provided for operations such as cooling torch components or workpieces, along with a second operating mode such that gas and electric power are provided for operation of the plasma arc torch, and preferably a neutral mode is provided such that the supply of gas and electric power to the plasma arc torch inhibited. As a result, a compact and efficient trigger system that enables a variety of operating modes is provided in accordance with the teachings of the present invention.

The description of the invention is merely exemplary in nature and, thus, variations that do not depart from the substance of the invention are intended to be within the scope of the invention. For example, the power switch 36 as shown is preferably a microswitch having a switch depressible arm to make or break electrical contact and to allow or prevent the flow of electric power, or current, although a variety of electrical switches may be employed without departing from the spirit and scope of the invention. Further, the selector 26 may be resiliently biased to the neutral position by alternate methods other than the first and second spring such as positioning slots within, for example, the housing 22. Additionally, the housing 22 and the selector 26 may follow other motions rather than the pivoting and sliding as described herein to activate the gas control device and the power switch. Accordingly, such variations are not to be regarded as a departure from the spirit and scope of the invention.

What is claimed is:

1. An apparatus for providing gas and electric power to a plasma arc torch comprising:

a selector comprising at least a first operating position and a second operating position, wherein the first operating position operates the apparatus in a first mode to deliver the gas to the plasma arc torch, and the second operating position operates the apparatus in a second mode to deliver the gas and the electric power to the plasma arc torch.

2. The apparatus according to claim 1 further comprising a housing, wherein the selector is disposed within the housing.

3. The apparatus according to claim 2, wherein the selector is slidably operable between the first operating position and the second operating position.

4. The apparatus according to claim 1, wherein the selector further comprises a neutral position for selecting a neutral mode in which delivery of the gas and the electric power to the plasma arc torch is inhibited.

5. The apparatus according to claim 4, wherein the selector is resiliently biased to the neutral position.

6. The apparatus according to claim 5 further comprising a first spring and a second spring disposed within the housing, wherein the first spring and the second spring resiliently bias the selector to the neutral position.

7. The apparatus according to claim 4, wherein the selector further comprises a post that engages an adjacent member within the plasma arc torch to inhibit upward movement of the selector when the selector is in the neutral position.

8. The apparatus according to claim 4 further comprising a housing, wherein the selector is disposed within the housing.

9. The apparatus according to claim 8, wherein the selector is slidably operable between the first operating position, the second operating position, and the neutral position.

10. An apparatus for providing gas and electric power to a plasma arc torch comprising:

a selector comprising a first operating position, a second operating position, and a neutral position, wherein the first operating position operates the apparatus in a first mode to deliver the gas to the plasma arc torch, the second operating position operates the apparatus in a second mode to deliver the gas and the electric power to the plasma arc torch, and the neutral position operates the apparatus in a neutral mode to inhibit delivery of the gas and the electric power to the plasma arc torch.

11. The apparatus according to claim 10 further comprising a housing, wherein the selector is disposed within the housing.

12. The apparatus according to claim 10, wherein the selector further comprises a post that engages an adjacent member within the plasma arc torch to inhibit upward movement of the selector when the selector is in the neutral position.

13. The apparatus according to claim 10, wherein the selector is slidably operable between the first operating position, the second operating position, and the neutral position.

14. The apparatus according to claim 10, wherein the selector is resiliently biased to the neutral position.

15. The apparatus according to claim 14 further comprising a first spring and a second spring disposed within the housing, wherein the first spring and the second spring resiliently bias the selector to the neutral position.

16. A trigger system for providing gas and electric power to a plasma arc torch comprising:

a housing; and a selector disposed within the housing for selecting among one of a first operating position, a second operating position, and a neutral position, wherein positioning the selector in the first operating position delivers the gas to the plasma arc torch, positioning the selector in the second operating position delivers the gas and the electric power to the plasma arc torch, and positioning the selector in the neutral position inhibits delivery of the gas and the electric power to the plasma arc torch.

17. The trigger system according to claim 16, wherein the selector is slidably operable between the first operating position, the second operating position, and the neutral position.

18. The trigger system according to claim 17, wherein the selector is resiliently biased to the neutral position.

19. The trigger system according to claim 18, further comprising a first spring and a second spring disposed within the housing, wherein the first spring and the second spring resiliently bias the selector to the neutral position.

20. The trigger system according to claim 16, wherein the selector further comprises a post that engages an adjacent member within the plasma arc torch to inhibit upward movement of the selector when the selector is in the neutral position.

21. A trigger system for providing gas and electric power to a plasma arc torch comprising:

a housing; and a selector disposed within the housing for selecting among one of a first operating position and a second operating position, wherein positioning the selector in the first operating position delivers the gas to the plasma arc torch and positioning the selector in the second operating position delivers the gas and the electric power to the plasma arc torch.

22. The trigger system according to claim 21, wherein the selector is slidably operable between the first operating position and the second operating position.

23. The trigger system according to claim 21, wherein the selector further comprises a neutral position for selecting a neutral mode in which delivery of the gas and the electric power to the plasma arc torch is inhibited.

24. The trigger system according to claim 23, wherein the selector further comprises a post that engages an adjacent member within the plasma arc torch to inhibit upward movement of the selector when the selector is in the neutral position.

25. The trigger system according to claim 23, wherein the selector is resiliently biased to the neutral position.

26. The trigger system according to claim 25 further comprising a first spring and a second spring disposed within the housing, wherein the first spring and the second spring resiliently bias the selector to the neutral position.

27. A plasma arc torch comprising:

a torch handle;

a gas control device disposed within the torch handle;

a housing disposed within the torch handle and operable with the gas control device;

a power switch disposed within the torch handle; and a selector disposed within the housing and operable with the power switch;

wherein the selector is operable to a first operating position such that the housing activates the gas control device, thereby operating the plasma arc torch in a first mode to deliver gas to the plasma arc torch; and wherein the selector is operable to a second operating position such that the selector activates the power switch, thereby operating the plasma arc torch in a second mode to deliver gas and electric power to the plasma arc torch.

28. The plasma arc torch according to claim 27, wherein the selector is slidably operable between the first operating position and the second operating position.

29. The plasma arc torch according to claim 27, wherein the housing is pivotably mounted to the torch handle.

30. The plasma arc torch according to claim 27, wherein the selector further comprises a neutral position for selecting a neutral mode in which delivery of the gas and the electric power to the plasma arc torch is inhibited.

31. The plasma arc torch according to claim 30, wherein the torch handle further defines a stop and the selector further comprises a post that engages the stop in the neutral position such that delivery of gas and electric power to the plasma arc torch is inhibited.

32. The plasma arc torch according to claim 30, wherein the selector is slidably operable between the first operating position, the second operating position, and the neutral position.

33. The plasma arc torch according to claim 30, wherein the select is resiliently biased to the neutral position.

34. The plasma arc torch according to claim 33, further comprising a first spring and a second spring disposed within the housing, wherein the first spring and the second spring resiliently bias the selector to the neutral position.

35. A plasma arc torch comprising:

a torch handle;

a gas control device disposed within the torch handle;

a housing disposed within the torch handle and operable with the gas control device;

a power switch disposed within the torch handle; and a selector disposed within the housing and operable with the power switch;

wherein the selector is operable to a first operating position such that the housing activates the gas control device, thereby operating the plasma arc torch in a first mode to deliver gas to the plasma arc torch, wherein the selector is operable to a second operating position such that the selector activates the power switch, thereby operating the plasma arc torch in a second mode to deliver gas and electric power to the plasma arc torch; and wherein the selector is operable to a neutral position such that delivery of gas and electric power to the plasma arc torch is inhibited.

36. The plasma arc torch according to claim 35, wherein the torch handle further defines a stop and the selector further comprises a post that engages the stop in the neutral position such that delivery of gas and electric power to the plasma arc torch is inhibited.

37. The plasma arc torch according to claim 35, wherein the selector is slidably operable between the first operating position, the second operating position, and the neutral position.

38. The plasma arc torch according to claim 35, wherein the housing is pivotably mounted to the torch handle.

39. The plasma arc torch according to claim 35, wherein the selector is resiliently biased to the neutral position.

40. The plasma arc torch according to claim 39, further comprising a first spring and a second spring disposed within the housing, wherein the first spring and the second spring resiliently bias the selector to the neutral position.

41. A plasma arc torch comprising:

a torch handle;

a gas control device disposed within the torch handle;

a housing disposed within the torch handle and operable with the gas control device;

a power switch disposed within the torch handle; and a selector disposed within the housing and operable with the power switch, wherein the selector is operable to a second operating position such that the selector activates the power switch, thereby operating the plasma arc torch in a second mode to deliver gas and electric power to the plasma arc torch; and wherein the selector is operable to a neutral position such that delivery of gas and electric power to the plasma arc torch is inhibited.

42. The plasma arc torch according to claim 41, wherein the selector is slidably operable between the second operating position and the neutral position.

43. The plasma arc torch according to claim 41, wherein the selector Is resiliently biased to the neutral position.

44. The plasma arc torch according to claim 43 further comprising a first spring and a second spring disposed within the housing, wherein the first spring and the second spring resiliently bias the selector to the neutral position.

45. The plasma arc torch according to claim 41, wherein the torch handle further defines a stop and the selector further comprises a post that engages the stop in the neutral position such that delivery of gas and electric power to the plasma arc torch is inhibited.

46. The plasma arc torch according to claim 41, wherein the selector further comprises a first operating position that operates the apparatus in a first mode to deliver the gas to the plasma arc torch.

47. The plasma arc torch according to claim 46, wherein the selector is slidably operable between the first operating position, the second operating position, and the neutral position.

48. The plasma arc torch according to claim 41, wherein the torch handle further comprises a second stop and the selector further comprises a post that engages the second stop such that the selector is inhibited from moving to a first operating position.

49. A housing disposed within a trigger system of a plasma arc apparatus that houses a selector, the selector being operable among one or more of a first operating position, a second operating position, and a neutral position, wherein the first operating position operates the plasma arc apparatus in a first mode to deliver gas to a plasma arc torch, the second operating position operates the plasma arc apparatus in a second mode to deliver the gas and electric power to the plasma arc torch, and the neutral position that operates the plasma arc apparatus in a neutral mode such that delivery of gas and electric power to the plasma arc torch is inhibited.

50. The housing according to claim 49, wherein the housing defines an aperture for disposition of the selector.

51. The housing according to claim 49, wherein the housing is pivotably mounted within the plasma arc torch.

52. The housing according to claim 49, further comprising an engagement cup that activates a gas control device to deliver gas to the plasma arc torch.

53. A selector for use in a trigger system of a plasma arc apparatus, the selector being operable among one or more of a first operating position, a second operating position, and a neutral position, wherein the first operating position operates the plasma arc apparatus in a first mode to deliver gas to a plasma arc torch, the second operating position operates the plasma arc apparatus in a second mode to deliver the gas and electric power to the plasma arc torch, and the neutral position that operates the plasma arc apparatus in a neutral mode such that delivery of gas and electric power to the plasma arc torch is inhibited.

54. The selector according to claim 53, wherein the selector further comprises a post that engages an adjacent component within the plasma arc torch to inhibit upward movement of the selector when the selector is in the neutral position.

55. The selector according to claim 53, further comprising an engagement member that activates a power switch disposed within the plasma arc torch to provide at least the electric power.

56. A method of operating a plasma arc torch between one of at least a first operating mode and a second operating mode, the method comprising the steps of:

providing a trigger system comprising a selector; and moving the selector between one of a first operating position and a second operating position, wherein the first operating position operates the plasma arc torch in the first mode to deliver gas to the plasma arc torch, and the second operating position operates the plasma arc torch in the second mode to deliver the gas and electric power to the plasma arc torch.

57. The method according to claim 56, further comprising the step of moving the selector to a neutral position such that delivery of the gas and the power to the plasma arc torch is inhibited.

58. A method of operating a plasma arc torch between a first operating mode, a second operating mode, and a neutral mode, the method comprising the steps of:

providing a trigger system comprising a selector; and moving the selector between one of a first operating position, a second operating position, a neutral position, wherein the first operating position operates the plasma arc torch in the first mode to deliver gas to the plasma arc torch, the second operating position operates the plasma arc torch in the second mode to deliver the gas and electric power to the plasma arc torch, and the neutral position selects a neutral mode in which delivery of the gas and the electric power to the plasma arc torch is inhibited.

* * * * *